United States Patent [19]

Calvert et al.

[11] Patent Number: 5,314,057
[45] Date of Patent: May 24, 1994

[54] FLIGHT BAR PATH HAVING A LARGE RADIUS

[75] Inventors: Rodney K. Calvert, Dunwoody; Alton J. Fishback, Austell; George R. Van Horne, Atlanta, all of Ga.

[73] Assignee: The Mead Corporation, Dayton, Ohio

[21] Appl. No.: 6,055

[22] Filed: Jan. 19, 1993

[51] Int. Cl.$^5$ ............................................. B65G 47/34
[52] U.S. Cl. .................................. 198/483.1; 198/604; 198/728
[58] Field of Search ............... 198/604, 606, 611, 719, 198/728, 483.1, 598, 626.1

[56] References Cited

U.S. PATENT DOCUMENTS

| | | | |
|---|---|---|---|
| 3,348,655 | 10/1967 | Pierce, Jr. et al. | 198/728 X |
| 3,352,403 | 11/1967 | Blake | 198/728 X |
| 3,370,692 | 2/1968 | Mosterd | 198/483.1 X |
| 3,524,529 | 8/1970 | Voran et al. | 198/483.1 X |
| 3,581,872 | 6/1971 | Grossjohann | 198/483.1 X |
| 3,669,239 | 6/1972 | Martin | 198/483.1 |
| 3,978,969 | 9/1976 | Williams et al. | 198/604 X |
| 3,978,971 | 9/1976 | Conrow et al. | 198/604 X |

*Primary Examiner*—D. Glenn Dayoan
*Attorney, Agent, or Firm*—Rodgers & Rodgers

[57] ABSTRACT

A packaging machine having a working reach interconnected with a return reach over which flight bars are movable is provided with a ramp formed with a long radius for interconnecting the working reach with the return reach. This long radius ramp eliminates the tendency for flight bars to accelerate at an unacceptable velocity and can lead to damage to adjacent cartons. The long radius together with a sprocket of increased diameter avoids exposure to the risk of damage to and breakage of cartons. This increased radius also tends to provide a gap between the working reach and an outfeed conveyor which is longer than that normally employed with conventional structures. This gap is bridged by rotatable support wheels having cutaway radial areas which afford clearance for flight bars on their way from the working reach to the return reach.

2 Claims, 3 Drawing Sheets

FLIGHT BAR PATH HAVING A LARGE RADIUS

TECHNICAL FIELD

This invention relates to packaging machines which are capable of operating at high speeds and which may develop machine, and product damage especially when operated at very high speeds.

BACKGROUND ART

Known systems having flight bars mounted on chains for moving cartons along the working reach of the machine may be moved onto the return reach by passing their support chains over sprockets having small radii and which may cause an angular acceleration of the flight bars as they are rotated onto the return reach so that a carton being moved by such a flight bar must be accelerated at a faster speed away from the flight bar in order to prevent damage to the carton by the downwardly accelerating flight bar.

SUMMARY OF THE INVENTION

A packaging machine having flight bars mounted on chains may transfer flight bars from their working reach to their return reach due to the provision of a ramp for passing the chains around a large radius of curvature which in turn causes the chains to move out of the path of movement of the cartons and also includes a large gap between the flight bars and an outfeed conveyor which gap is bridged by a rotatable support wheel which engages oncoming cartons so as to convey such cartons onto the outfeed conveyor.

BEST MODE OF CARRYING OUT THE INVENTION

Figure 1:
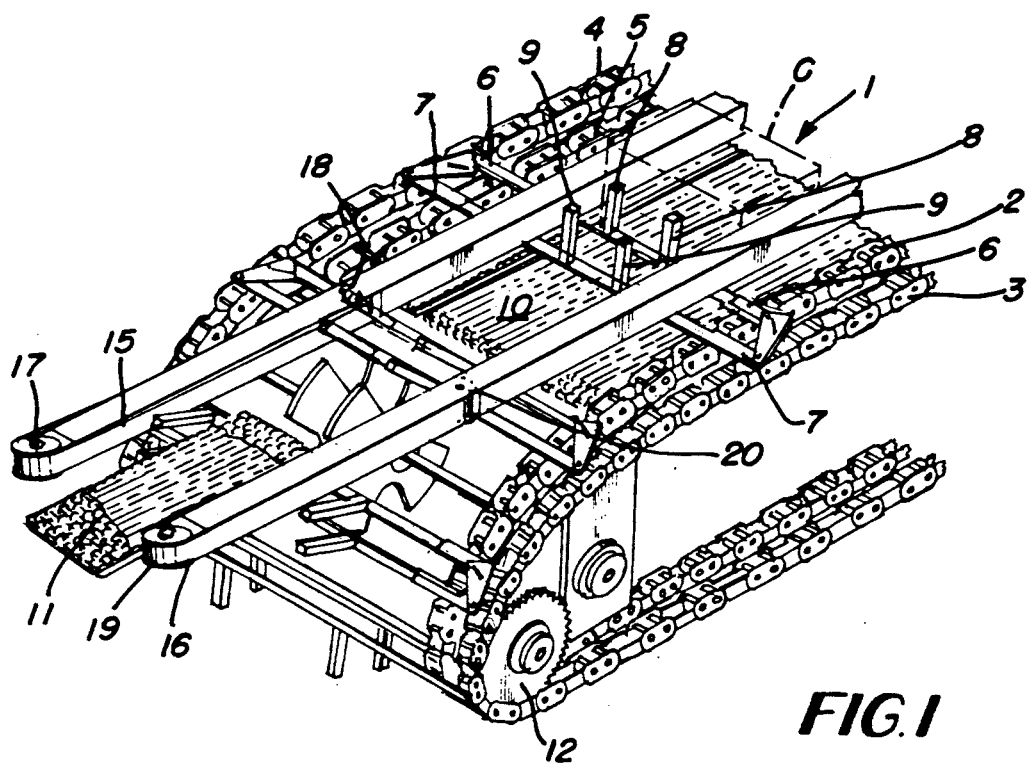
FIG. 1 is a perspective view of the outfeed end of a packaging machine which is constructed according to this invention.

In FIG. 1, a portion of the working reach of the machine there depicted is indicated by the numeral 1. Dual endless chains 2 and 3 on one side of the machine are shown and similar endless chains 4 and 5 are shown on the opposite side of the machine. Flight bars are interconnected with the chains 2, 3, 4 and 5 as best shown in U.S. application Ser. No. 5,349, filed Jan. 19, 1993. The dual flight bars are indicated in FIG. 1 by the numerals 6 and 7. These flight bars both leading and trailing include uprights 8 and 9. The working reach conveyor is designated by the numeral 10 and is depicted immediately below the uprights 8 and 9.

Figure 2:
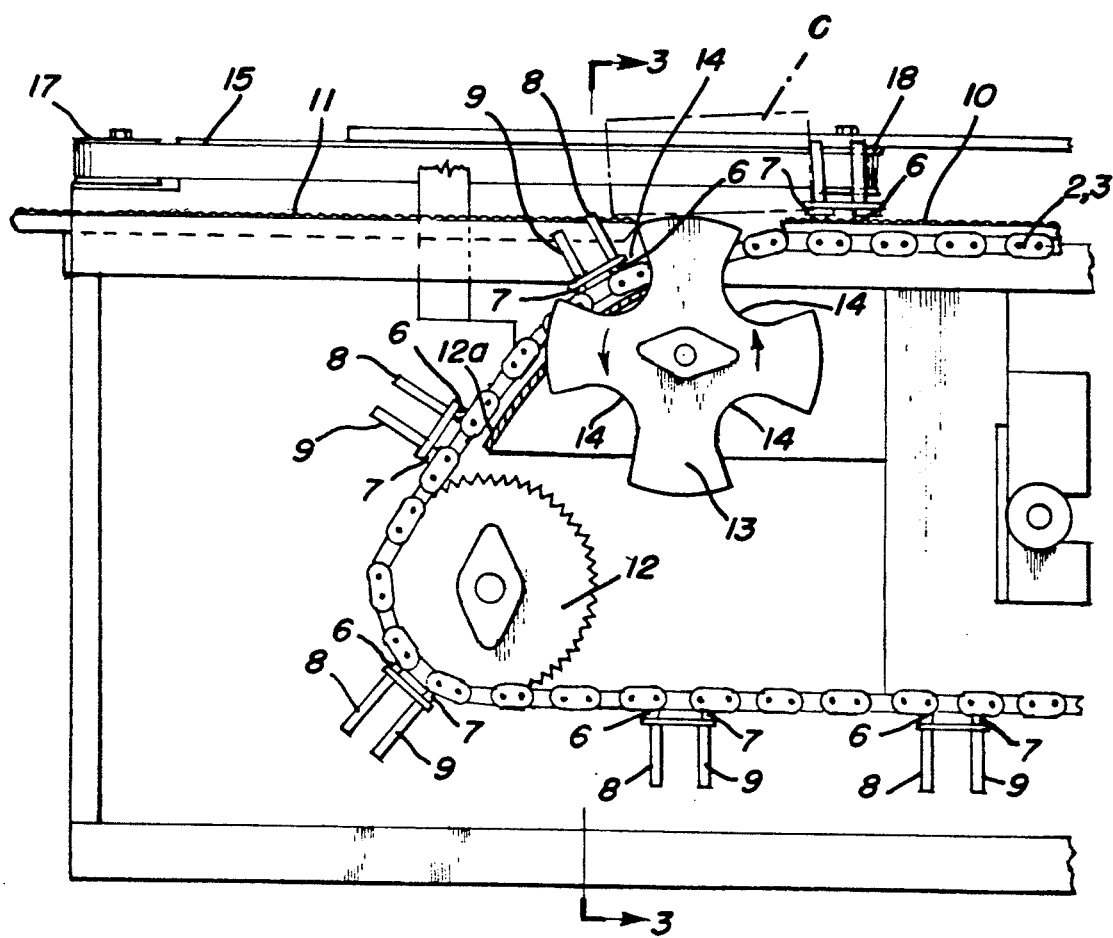
FIG. 2 is a fragmentary side elevation of the machine showing how provision is made for avoiding disruptive and hazardous damage when a high speed high capacity machine is operated near its upper speed limit.

Known machines which operate at moderate and slow speeds are constructed in such a manner that flight bars such as 6 and 7 are suddenly disposed about sprockets indicated in FIG. 2 by the numeral 12 but which are constructed of very small diameters so that flight bars leaving the working reach of the system and moving downwardly about sprockets which are of small diameter tend to accelerate to speeds which pose a hazard to the machine and to cartons which are running over the machine.

According to this invention, a ramp structure having a long radius is indicated by the numeral 12a and thus prolongs and slows down the tendency for the machine to damage flight bars or associated cartons. Such structure provides a gap between the working reach 10 and the outfeed conveyor 11. According to one feature of this invention, this space is accommodated by the use of a rotatable support wheel 13. Thus packages leaving the left hand end of the working reach 10 simply are supported and carried over to the right hand end of the outfeed conveyor 11 by the support wheel 13. This wheel is provided with cutaway areas 14 which provide space in which the synchronously movable flight bars 6 and 7 and the uprights 8 and 9 may ride as indicated in the upper portion of FIG. 2.

For the purpose of stabilizing packages of cartons as they pass along the working reach and over the support wheel 13 a belt 15 is mounted on one side of the machine and another similar belt is indicated by the designation 16 and is mounted on the opposite side of the machine. Belt 15 is disposed about rollers 17 and 18 while belt 16 is disposed about rollers 19 and 20.

Figure 3:
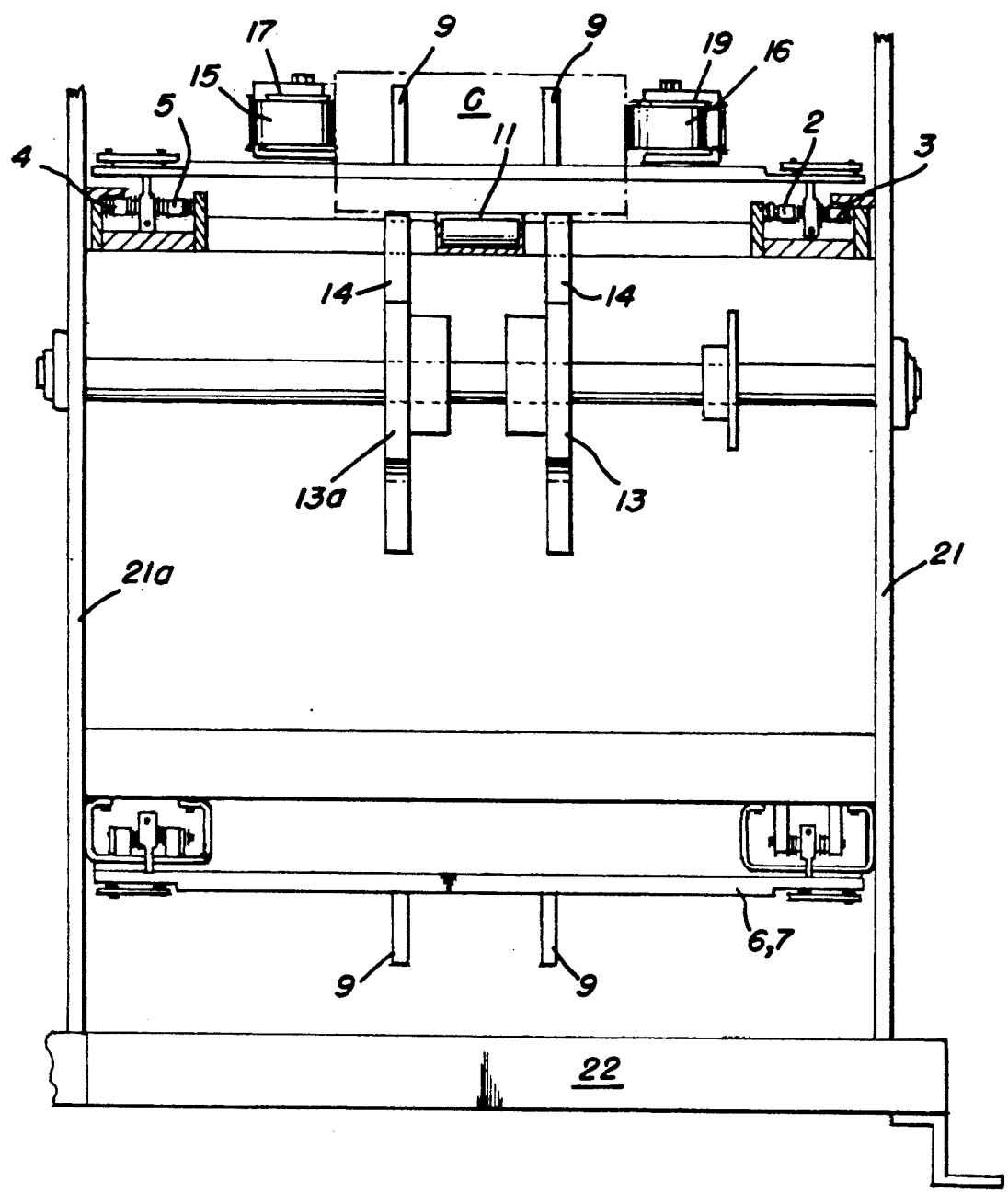
FIG. 3 is a cross sectional view taken along the line designated 3—3 in FIG. 2.
Figure 4:
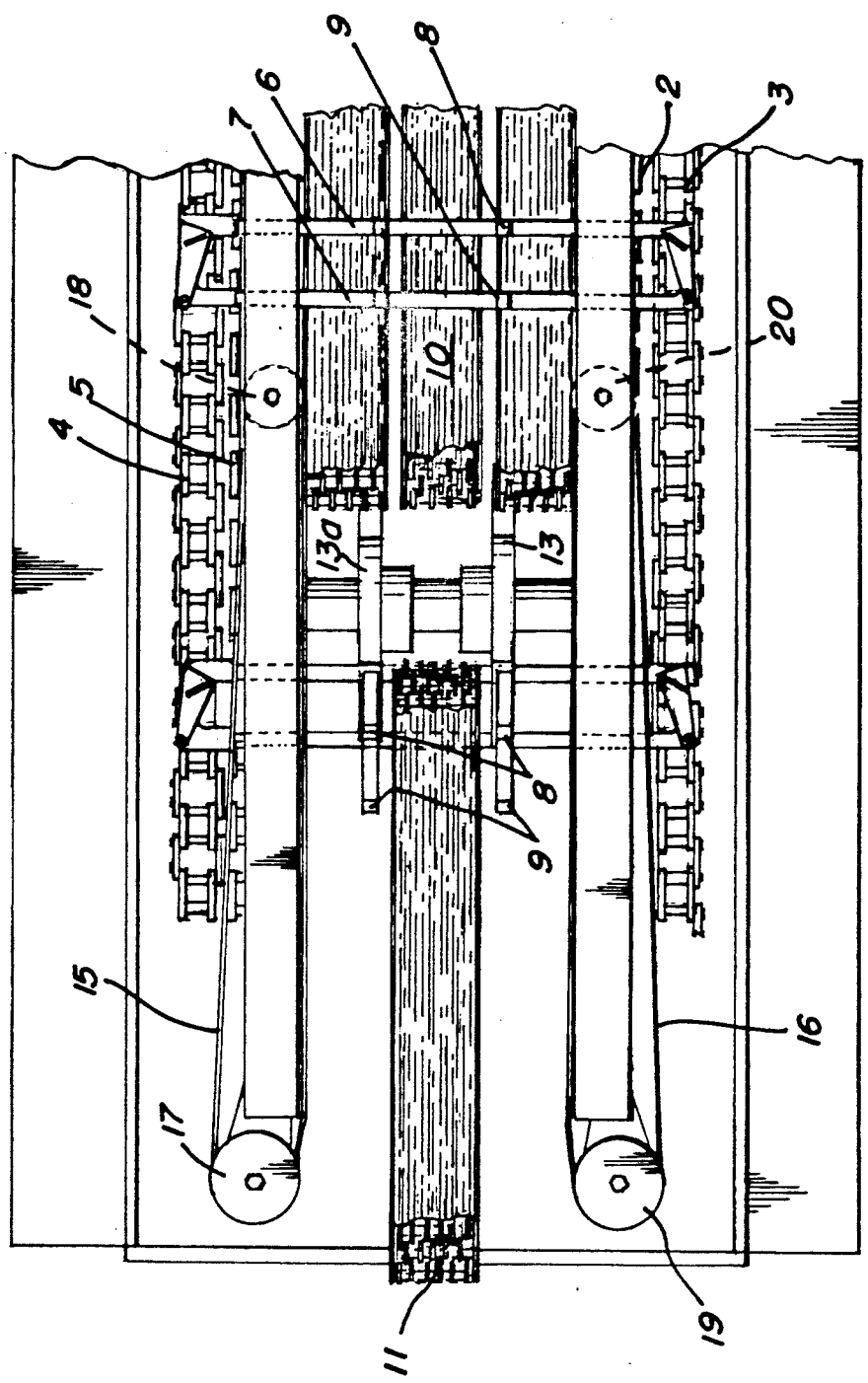
FIG. 4 is a fragmentary top plan view of the machine showing the location of belt systems and chain drives with flight bars and side belts and their associated rollers.

As shown in FIG. 3, the support wheel 13 preferably is a dual structure. In FIG. 3, this structure is indicated by the numerals 13 and 13a. FIG. 3 shows the belts 15 and 16, and the chains 2, 3, 4 and 5. IN FIG. 3 the dual flight bars 6, 7 are shown and a carton is designated by C and is shown in phantom lines.

According to this invention, it is obvious that by employing a large radius flight bar path and by the addition of a large sprocket such as 12 and of a support wheel such as 13 and 13a, high speed machines of substantial capacity are made feasible without unduly stressing the machine components.

We claim:

1. A carton conveying system having flight bars mounted on movable chains so that transfer of the flight bars from their working reach to their return reach is provided with a ramp for passing the chains around a large radius of curvature which in turn causes the chains to move out of the path of movement of the cartons and also requires a large gap between the flight bars and an outfeed conveyor which gap is bridged by a rotatable support wheel movable in synchronism with said chains and which engages oncoming cartons and conveys such cartons onto the outfeed conveyor, cutaway areas provided in said rotatable support wheel for receiving flight bars as they proceed along said ramp and about said rotatable support wheel, and guide means disposed on opposite sides of the path of movement of the cartons while the cartons are supported and moved by said rotatable support wheel.

2. A system according to claim 1 wherein a pair of side by side rotatable support wheels serve to engage and convey oncoming cartons onto the outfeed conveyor.

* * * * *